(12) United States Patent
Robles et al.

(10) Patent No.: US 7,996,638 B2
(45) Date of Patent: Aug. 9, 2011

(54) APPLICATION DEPENDENT STORAGE CONTROL

(75) Inventors: Javier Cañis Robles, Madrid (ES); Eitan Mardiks, Raanana (IL)

(73) Assignee: SanDisk IL Ltd., Kfar Saba (IL)

( * ) Notice: Subject to any disclaimer, the term of this patent is extended or adjusted under 35 U.S.C. 154(b) by 328 days.

(21) Appl. No.: 11/868,971

(22) Filed: Oct. 9, 2007

(65) Prior Publication Data
US 2008/0086614 A1    Apr. 10, 2008

Related U.S. Application Data

(60) Provisional application No. 60/828,661, filed on Oct. 9, 2006.

(51) Int. Cl.
*G06F 12/14* (2006.01)
(52) U.S. Cl. ............ 711/163; 710/23; 710/28; 711/167; 711/170
(58) Field of Classification Search .................. 711/163, 711/167, 170; 710/23, 28
See application file for complete search history.

(56) References Cited

U.S. PATENT DOCUMENTS

| | | | |
|---|---|---|---|
| 6,005,942 A | 12/1999 | Chan et al. | |
| 6,801,992 B2 | 10/2004 | Gajjar et al. | |
| 2002/0040936 A1* | 4/2002 | Wentker et al. | 235/492 |
| 2003/0054860 A1* | 3/2003 | Chen | 455/558 |
| 2003/0084255 A1* | 5/2003 | Suzuki et al. | 711/150 |
| 2004/0093592 A1* | 5/2004 | Rao | 717/168 |
| 2005/0160428 A1 | 7/2005 | Ayachitula et al. | |

OTHER PUBLICATIONS

Search Report and Written Opinion for Corresponding PCT Application No. PCT/IL2007/001206, 8 pages, mailed May 7, 2008.
Office Action from corresponding Taiwan Appln. No. 096137762 dated Apr. 26, 2011 (11 pgs).

* cited by examiner

*Primary Examiner* — Jae U Yu
(74) *Attorney, Agent, or Firm* — Brinks Hofer Gilson & Lione (57) ABSTRACT

A system for enforcing a storage allocation usage right(s) for an application may include a controllable storage and a storage manager to control the access of the application to the storage according to an associated storage allocation usage right. A SIM card for enforcing a storage allocation usage right for an application may include an application register to store an access rule of the storage allocation usage right(s) and an APREC module to identify the application and thereby an access rule to enable controlling of the access of the application to storage according to the storage allocation usage right. A high-capacity SIM card for enforcing a storage allocation usage right for an application may include a storage; a storage manager to control the access of an application to the storage according to an associated access rule of the storage allocation usage right; and an APREC module.

29 Claims, 7 Drawing Sheets

Fig. 8

APPLICATION DEPENDENT STORAGE CONTROL

RELATED APPLICATIONS

This patent application claims the benefit of U.S. Provisional Patent Application No. 60/828,661, filed Oct. 09, 2006, the content of which is herein incorporated by reference in its entirety.

BACKGROUND

Computer storage devices are essential resources in computer systems, as they store instruction codes, application programs and various types of data. The use of mobile devices, such as mobile phones and personal digital assistance (PDA) devices, and distribution of various types of applications and applications-related data continues to become more prevalent, and, in general, applications, which are continually being developed, require more storage resources. Storage is generally considered to be an expensive computer resource.

The larger the storage capacity of a storage device, the lower is its cost per gigabyte. The term "gigabyte" ("GB") references a unit of information or a computer storage equal to one billion ($10^9$) bytes, where "byte", which often is a group of eight binary bits, is commonly used as a basic unit of storage measurement in computers, regardless of the type of data being stored. For example, a one-gigabyte storage device is usually more expensive than one gigabyte in a ten-gigabyte storage device.

Sometimes, a host residing, for example in a mobile phone, is required to simultaneously execute several applications, and each application may have a different storage requirement that may dynamically change while the application is executed. For example, an application program that plays multimedia content typically requires storage of several megabytes. Such applications will not be able to run properly on a host device if the available storage in the host device is not as large. Because storage resources are limited, applications requesting access to storage are traditionally allocated storage on a "first-to-request" basis.

From commercial and technical points of view, competition between applications' publishers for storage, for example in a mobile device, is of interest. The term "publisher" references application(s) provider that provides end users with application programs such as media players, and or with digital content such as a multimedia content and or other types of data or information. Instead of competing for storage availability with other publishers, publishers may want to guarantee, in advance, that whenever an end user launches their application, the application will be allocated a sufficiently large storage space regardless of its type and any of its inherent characteristic and, under some circumstances, the allocated storage will be reserved for the application for future usage. Therefore, it would be reasonable to use a single high-capacity storage device and to guarantee to applications running on a host sufficient storage in that storage device. Today, however, usage of storage resources is not prioritized in that respect. U.S. Pat. No. 6,801,992, to Gajjar et al., discloses system and method for policy based storage provisioning and management that allow uniform deployment of storage provisioning policies in a heterogeneous storage environment. US app. No. 2005/0160428, to Ayachitula et al., discloses an application-aware system that provides consistent quality of service for similar types of applications.

Thus, there is a need for an application-dependent storage control system that will implement an application-dependent storage allocation methodology based on storage usage rights. Regarding mobile phones, there is a need for a storage prioritization method for enabling publishers and network operators, such as Mobile Network Operators (MNOs), to agree in advance to which applications storage will be allocated, for example in mobile phones. There is also a need for a method that will enable a network operator to remotely set and enforce a storage allocation usage right(s) on an application running on a host of a mobile device, such as a mobile phone, based on agreed upon usage rights.

SUMMARY

The following embodiments and aspects thereof are described and illustrated in conjunction with systems, tools, and methods, which are meant to be exemplary and illustrative but not limiting in scope.

According to the present invention, a system for remotely enforcing a storage allocation usage right(s) for an application running on a host is provided, the storage allocation being based on agreed upon usage right(s), the system including a controllable storage and a storage manager configured to control the access of the application to the storage according to an associated access rule of the storage allocation usage right(s). "Remotely enforcing a storage allocation usage right (s)") may include any combination of the following: reaching an agreement as to the usage right's particulars, setting the usage right(s), forwarding the usage right(s) from the originator of the usage right(s) (e.g., mobile network operator) to intended device(s), causing the intended device(s) to implement the storage allocation usage right(s). By "controllable storage" is meant any type of storage device which has one storage area or more storage areas having the same size or different sizes, to which access can be controlled. "Controlling storage" includes the ability to partition the storage space to any desired number of storage areas, and controlling the access of an application to any of one or more storage areas individually or collectively. Depending on the context, "accessing a storage area" means accessing one storage area or more than one storage area within the storage device, The system may further include an application register that is configured to store one access rule or multiple access rules of the storage allocation usage right(s). The system may further include an application recognition (APREC) module (also referred to herein as "application recognizer"). As part of the present invention, the APREC may be configured to uniquely identify the application by obtaining a unique identifier of the application, and to use the unique identifier to identify in the stored access rules, and to send to the storage manager, an associated access rule. The APREC may also use the unique identifier to authenticate the involved application, for example to make sure it is an eligible (and not an imposter) application. The storage manager may control the access of the application to the storage space by enforcing the access rule on the application. As used herein, an application is "unique", or it can be uniquely identified, if it has, includes, has been assigned, or it has associated with it, a unique identifier. In that respect, the type of application and inherent characteristics thereof are irrelevant because identical and similar applications can have different unique identifiers. Put otherwise, depending what whether an application is "licensed" or not (licensing an application is discussed in connection with the figures), the application can be allocated a storage area for its exclusive use, or be deprived of such usage right.

The host may be a mobile device, which may be a mobile phone. The controllable storage may be part of a storage device, which may be a memory card, High-Capacity SIM (HCS) card, and the like. The storage manager may reside in the storage device (for example HCS card or memory card) or in the host of the storage device.

The system may further include a storage access mediator residing in the host. The storage access mediator may enable the transfer of a unique application identifier from a launched or running application to the APREC, and the transfer of one or more access rules from the APREC to the storage manager, the one or more access rules being associated with the transferred unique application identifier.

According to an embodiment of the present invention, the HCS card is embodied as separate subscriber identifier card and controllable storage space, and the APREC and the application register reside in the subscriber identifier card and the storage manager resides in, or it is operationally adjacent, the controllable storage space. "Subscriber identifier card" references herein a memory device that securely stores service-subscriber key, code, or information, for identifying a mobile phone, or a mobile phone subscriber, or both, and network specific information to authenticate and identify subscribers on the network. SIM card is an exemplary subscriber identifier.

According to an embodiment of the present invention, the subscriber identifier card enables the enforcement of a storage allocation usage right(s) for an application running on a host, and its application register is configured to store an access rule of the storage allocation usage right(s), the access rule being associated with the application. An application recognition (APREC) module in the subscriber identifier card may be configured to receive from an application the application's unique identifier, use the identifier to retrieve and to send the access rule to the storage manager to enable it or to instruct it how to control the access of the application to a controllable storage according to the storage allocation usage right(s) set for that application.

According to another embodiment, the subscriber identifier card and the controllable storage constitute one device, referred to herein as "subscriber identifier card with controllable storage space", or, interchangeably, "controllable storage space with subscriber identification capability". High-Capacity SIM (HCS) card is an exemplary controllable storage space with subscriber identification capability. The term "HCS" will be used hereinafter for the sake of simplicity, but it is to be construed as referring in general to any device that can function both as "subscriber identifier card" and "controllable storage space".

According to the present invention, a HCS card for enforcing a storage allocation usage right(s) for an application running on a host is provided. The HCS card may include a controllable storage space; a storage manager configured to control the access of an application to the controllable storage space according to an associated access rule of a storage allocation usage right(s); application register configured to store an access rule of the storage allocation usage right(s), the access rule being associated with the application, and an application recognition (APREC) module configured to receive from the application a unique identifier, use the unique identifier to retrieve the stored access rule and to send it to the storage manager to enable it, or to instruct it how, to control the access of the application to the controllable storage space according to the storage allocation usage right(s).

Also provided is a method for enforcing a storage allocation usage right(s) for an application running on a host that interfaces with a subscriber identifier card and with a controllable storage space. The method may include storing an access rule of the storage allocation usage right(s), the access rule being associated with the application or with the application type; and allocating, based on the access rule, the storage space for utilization by the application. Enforcement of the storage allocation usage right(s) on the application may be executed by the storage manager enforcing the access rule on the application.

The access rule and the associated application may be identified by an APREC module in the subscriber identifier card based on a unique identifier of the application, which the APREC may use to identify and to transfer the appropriate access rule to the storage manager for enforcement on the application. Optionally, the APREC may use the application's unique identifier to authenticate the application. If the authentication fails, the APREC may send to the storage manager an "authentication failure" message. Responsive to this massage, the storage manager will allow the application to access only available public or free portion(s) of the storage space.

Allocation of storage space for the application may include reserving the storage space for the application even for when the application is not running or only for when the application is running, in which case the content of the allocated storage space may be discarded before the storage space is allocated to another application.

Also provided is a method of preparing an application for running in a remote device in compliance with a storage allocation usage right(s), the method may include receiving a unique identifier (ID) of the application for associating the application with an access rule of the storage allocation usage right(s), the access rule indicating how to allocate storage space in the remote device to the application; and appending said identifier to the application. The unique identifier may be part of a name of an identifier-transferring (IDT) file enabling obtaining the unique ID.

Also provided is a method for remotely allocating storage space in a remote device to an application, the method may include sending to the publisher of the application a unique identifier of the application that associates the application with an access rule of a storage allocation usage right(s), the access rule indicating how to allocate storage space in the remote device to the application based on storage allocation usage right(s); and sending the access rule and the unique identifier to the remote device. The identifier may as well be used to authenticate the application in the remote device prior to the association of the application with an access rule.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

It will be appreciated that for simplicity and clarity of illustration, elements shown in the figures are not necessarily drawn to scale. Further, where considered appropriate, reference numerals may be repeated among the figures to indicate like, corresponding or analogous elements

DETAILED DESCRIPTION

The invention summarized above and defined by the claims below will be better understood by referring to the present detailed description of embodiments of the invention. This description is not intended to limit the scope of claims but instead to provide examples of the invention.

U.S. Provisional Patent Application No. 60/746,369 (hereinafter '369), by Jose Carlos Santos Garcia, which is entitled "SIM Storage Control", filed May 4, 2006, discloses a storage partitioning method by which a remote control message causes a storage space in a mobile device to be partitioned, and a partition profile to be linked to each partition to enable a user of the mobile device to control the usage of the storage partition(s).

The present invention may utilize a storage control method similar to the method of '369. However, in the present invention, controllable storage spaces are allocated to applications running on a host, and the access of the applications to the storage spaces allocated to them is managed as discussed herein. The present invention further includes identifying the application requesting a storage access, and enforcing access rules as discussed herein. Allocation of storage spaces to applications is carried out according to a storage allocation usage right(s) that can be set in advance, for example during manufacturing of the storage device or mobile device, or remotely, for example by a network operator. Other aspects of the present invention include system and devices that use the storage allocation and control method.

Figure 1:
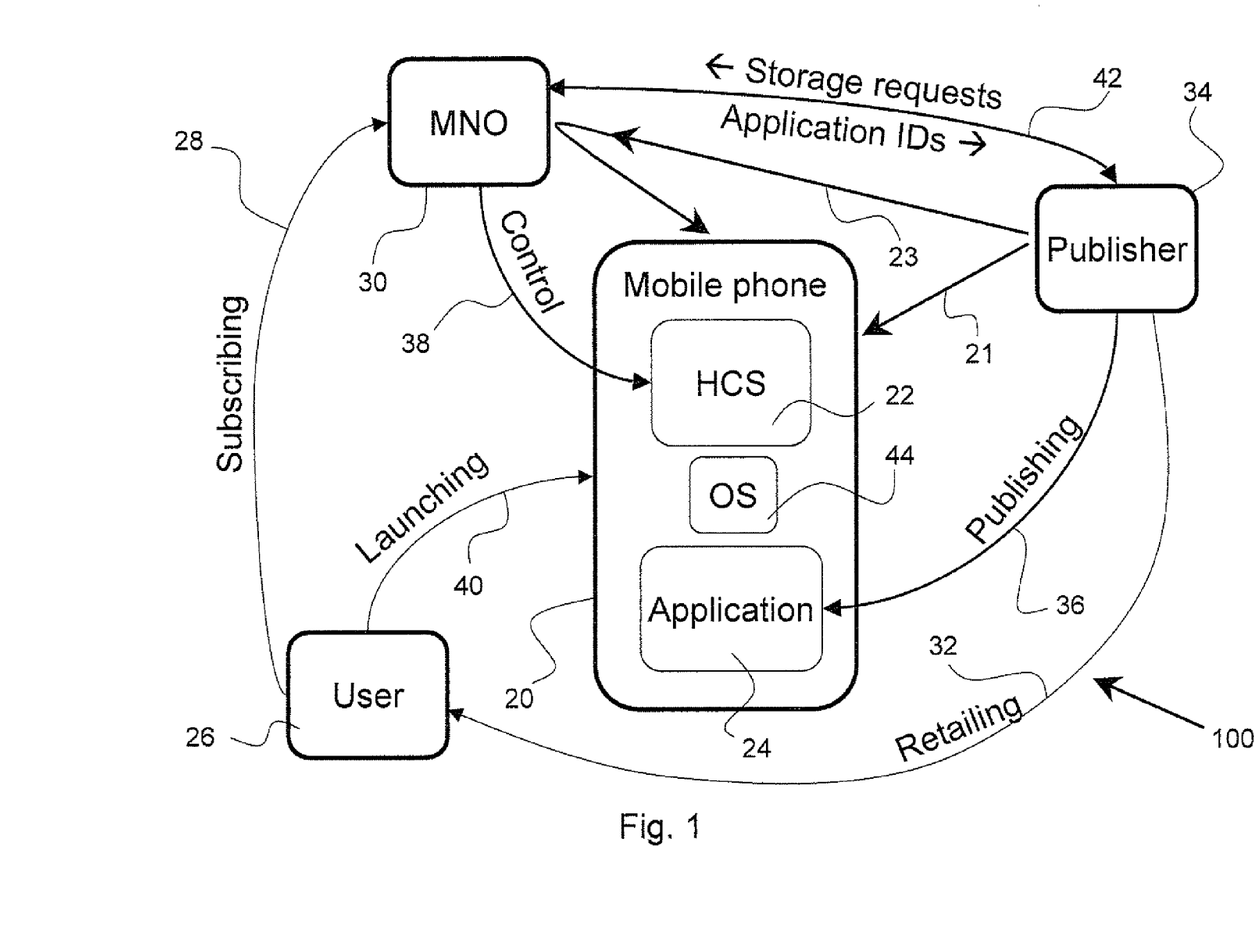
FIG. 1 schematically illustrates a telecommunication system in accordance with the present invention.

FIG. 1 schematically illustrates a system, which is generally shown at 100, that operates in accordance with the present invention. System 100 includes a network operator, shown as MNO 30, a mobile phone, shown as mobile phone 20, and an application provider, shown as publisher 34. Mobile phone 20 is a host, which includes a mobile phone's operating system (OS) 44 and a High-Capacity SIM card (HCS) 22, which includes a relatively large (typically hundreds of megabytes) of storage space.

User 26 is a subscriber (28) of MNO 30, and MNO 30 renders to user 26 telecommunication and telecommunication-related services through mobile phone 20. Publisher 34 may retail 32 to user 26 one or more applications and application-related data or information. After user 26 and publisher 34 reach an agreement to send to mobile phone 20 one or more applications, publisher 34 publishes (uploads) 36 to mobile phone 20 these application(s). Before publisher 34 publishes an application to mobile phone 20, publisher has to prepare the application for running on the mobile phone 20, an exemplary host. The implications involved in such preparations are described below in connection with the figures discussed below.

Figure 2:
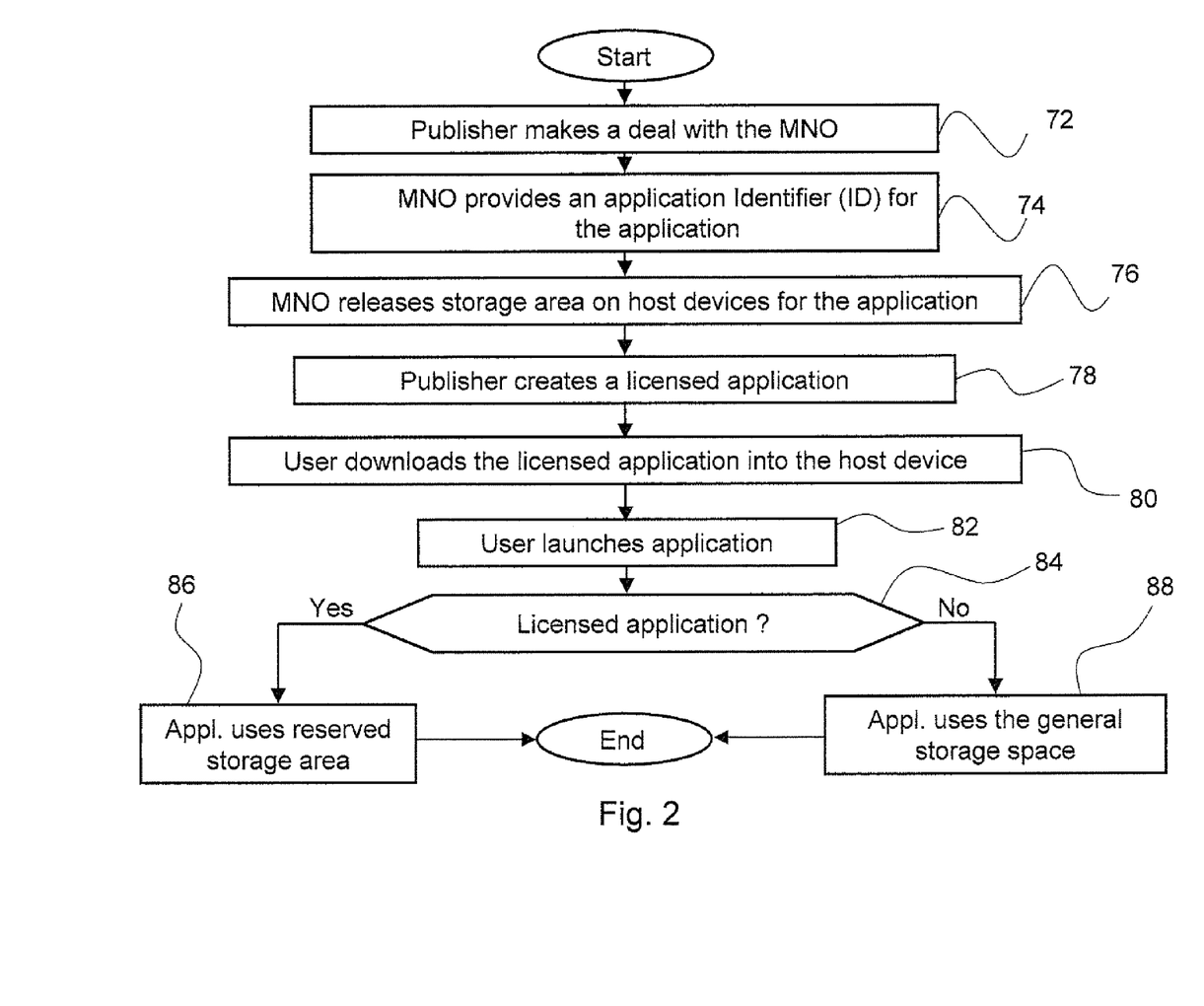
FIG. 2 is a high level flowchart illustrating a storage allocation method in accordance with the present invention.

FIG. 1 will now be described in association with FIG. 2, which is a flowchart illustrating a storage allocation method in accordance with the present invention. In order for some applications to properly run on mobile phone 20, a sufficient storage space in HCS 22 has to be available to the application during its execution. In order to ensure that such a storage space is always available, a sufficient storage space has to be allocated to the application in advance, and reserved for the application.

Rendering a Storage Space to an Application

To render a storage space to application 24 in HCS 22, publisher 34 makes a deal with MNO 30, shown at step 72 ("Publisher makes a deal with the MNO"). As part of the process involved in allocating the storage space to application 24, publisher 34 communicates to MNO 30 a storage request 42 to allocate a storage space in HCS 22 to the application, before or after publisher 34 publishes (36) application 24 to mobile phone 20.

At step 74, MNO 30 assigns a unique identifier (not shown in FIG. 1) to the application and provides it to publisher 34, shown at 42, and to mobile phone 20, shown at 38. Publisher 34 utilizes the application's ID to license the storage licensed application; that is, to prepare the application for running on mobile phone 20, as elaborated in connection with step 78, discussed below. Mobile phone 20 utilizes the application's ID to identify the application as a storage licensed application, as elaborated in connection with step 84 discussed below, and to find and enforce on the storage access rule(s) associated with a storage allocation usage right(s) applicable to the application. Storage allocation usage rights are assigned per application, which means that each application is assigned a unique storage allocation usage right.

Releasing an Allocated Storage

At step 76, MNO 30 issues a storage allocation usage right for the application, which is based on the storage allocation agreement. The storage allocation usage right may include attributes related to the required size of the storage space to be allocated to application 24, and to access rules governing the application's access to storage space allocated in HCS 22 to the application. The storage allocation usage right may include other, alternative, or additional types of storage-related and/or application-related attributes. Application identifiers are exemplary application-related attributes. Storage access rules are exemplary storage-related attributes. Mobile phone 20 includes a storage manager (not shown in FIG. 1) for enforcing a storage allocation usage right on an application. For the sake of brevity, only one publisher, shown as publisher 34, is shown in FIG. 1. Mobile phone 20 includes an application register (not shown in FIG. 1) for registering, or storing, access rules of storage allocation policies, so that every time a storage licensed application issues a request to access HCS 22, the storage manager will control the application's access to the storage space according to access rule(s) of a storage allocation usage right that is applicable to this application. The application register may also register or store unique application identifiers to enable retrieval of applicable stored access rules. The process involved in the identification of the applicable access rule(s) is discussed below.

It is noted that a storage space can be allocated to an application exclusively, which means that no other application can access that storage space, with the following exception. Under some circumstances, which are to be specified in the involved storage allocation usage right, a storage space can be used by the application so long as the application runs, but another application can use that storage space at other times; that is, whenever the first application is terminated, or at periods during which the first application idles. If several storage licensed applications require substantially the same storage space at substantially the same time, a prioritization mechanism may be employed Such a mechanism may be specified in, or provided by, the involved storage allocation policies, or it may be embodied as a background application running on the host, or the involved storage manager may also be configured to manage that aspect.

At step 76, MNO 30 remotely releases the storage space allocated for application 24 in HCS 22 by sending (38) the associated access rules of the storage allocation usage right to mobile phone 20, and by causing the storage manager (not shown in FIG. 1) in mobile device 20 to reserve the allocated storage space for the intended application. By "releasing a storage space" is meant herein excluding an allocated storage space from a public storage space. HCS 22 may include a public storage space, which may be used by non-licensed, or "ordinary", applications, and "released" storage spaces, which are storage spaces allocated to, and intended to be used only by, licensed applications; that is, by applications that were prepared by a publisher such as publisher 34 for running on a host such as mobile phone 20.

Application 24 is rendered an access to its allocated storage space every time application 24 is required to read data from, or to write data into, the storage space. Depending on the involved storage allocation usage right, the storage space allocated to application 24 may be reserved for application 24 at other times, for example when application 24 is inactive or when it idles.

MNO 30 may communicate the storage allocation usage right associated with application 24 only to mobile phone 20, or to a plurality of mobile devices. For example, MNO 30 may communicate the storage allocation usage right associated with application 24 to pre-selected subscribers, or to subscribers that meet a certain criterion. Such a criterion may be subscribers having mobile phones of the same type, or the mobile phones including a certain type of application, or the subscribers being associated with a specific group of subscribers. The basis for grouping subscribers may be geographic or a common field of interest. Other criteria may likewise be used.

Depending on the involved storage allocation usage right (s), the content of an allocated storage space may be discarded after the associated application is terminated, and the storage space may be allocated to another application. In this respect, it may be said that several applications, or several publishers, share a common storage space on a "short-term" basis. However, an allocated storage space may be reserved for an application, and its content be retained, between subsequent executions of the application and after the application is terminated. This way, the storage space remains available to the licensed application substantially at any time. It may be said that, under such circumstances, a storage space is permanently reserved to the licensed application.

Licensing Storage to an Application

At step 78 ("Publisher creates a storage licensed application"), publisher 34 uses the application identifier provided by MNO 30 at step 74 to prepare the application for running on mobile phone 20. By "licensing storage to an application", or, interchangeably, by "preparing an application for running on a host", is meant herein appending, such as by affiliating, incorporating or embedding, an application identifier to an application before the application is published (sent) to one or more hosts. The term "storage licensed application" refer- ences herein an application for which its publisher obtained from the MNO a license, or usage right, to reserve, or to use a certain amount of reserved, storage area in a mobile device. Such an application contains a unique identifier to associate it with one or more access rules. The one or more access rules can be agreed upon between the MNO and the application's publisher. Licensing storage to an application may include another step, which is discussed below.

Using an Allocated Storage Space

After publisher 34 licenses, at step 78, the storage licensed application, user 26 purchases (32) and downloads (36) from publisher 34 the storage licensed application into mobile phone 20, at step 80. In FIG. 1, application 24 is a storage licensed application downloaded by user 26 from publisher 34.

At step 82, user 26 launches 40 an application and at step 84 it is checked in mobile phone 20 whether the launched application is a storage licensed application or not, in order to determine whether or not a storage space has been allocated to the application in HCS 22. If the launched application is a licensed application (shown as "Yes" at step 84), this means that a storage space has been allocated to, and is to be reserved for or used by, the application. Regarding application 24, which is said above to be a storage licensed application, it can access the storage space allocated and reserved for it, as shown at step 86, in accordance with the access rules which have been specified in the involved storage allocation usage right, as communicated (38) to mobile phone 20 by MNO 30 at step 76.

If, however, it is decided at step 84 that the launched application is unlicensed (shown as "No" at step 84), the unlicensed application will be able to utilize only the public storage space in HCS 22, as shown at step 88. If the size of the available (free) public storage space in HCS 22 is inadequate, the unlicensed application may abort for lacking storage space, or it may not be able to run at all.

Publisher 34 may communicate to mobile phone 20 applications and applications-related data, such as multimedia content, by using direct communication path 21, or via MNO 30, by using indirect communication path 23. Publisher 34 may, however, use both communication paths 21 and 23 to communicate applications and related data to mobile phone 20.

By setting and communicating access rules of storage allocation policies to mobile phones such as mobile phone 20, MNO 30 remotely controls the access of applications, such as application 24, to storage spaces in HCS 22. As implied above, mobile devices utilize application identifiers (IDs) to check whether launched applications are storage licensed applications, and to respectively associate storage licensed applications with access rules. By way of example, two mechanisms for obtaining application identifiers in a mobile device are discussed below in connection with FIGS. 8 and 9. In general, one mechanism involves using storage access requests to transfer applications' unique identifiers from launched or running applications to an APREC. The second mechanism involves using a fictive or dummy file, which is referred to herein as the "identifier-transferring file", or "IDT file" for short.

Figure 3:
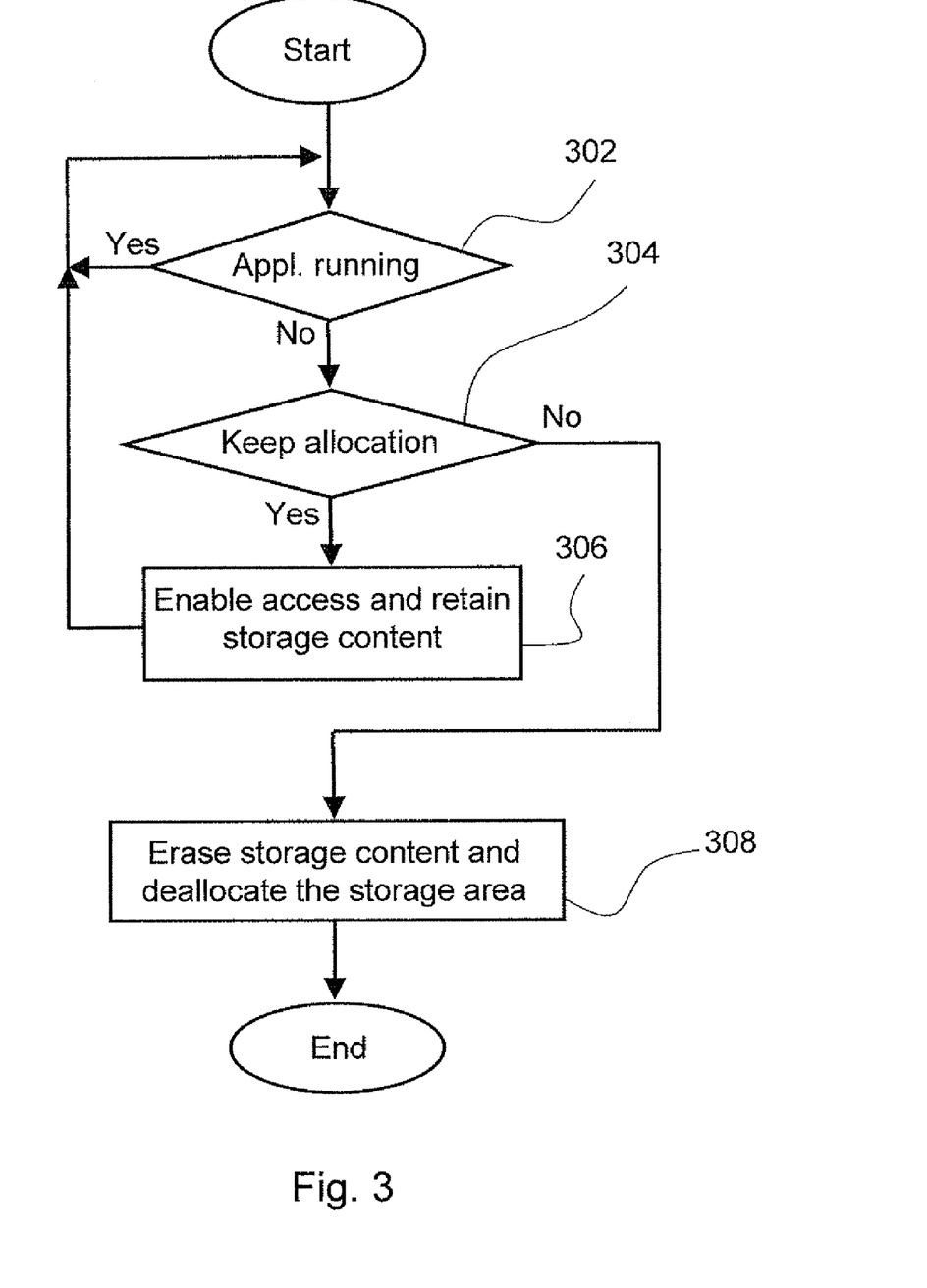
FIG. 3 is a flowchart illustrating a method of manipulation of an allocated storage space in accordance with the present invention.

FIG. 3 is a flowchart illustrating management of an allocated storage space in accordance with the present invention. FIG. 3 will be described in association with FIG. 1. Assuming that application 24, which is a licensed application, was launched by user 26, it is checked at step 302 ("Appl. Running?") whether application 24 is still running. Checking whether or not an application is running may be performed constantly, periodically, intermittently, or occasionally. If it is determined at step 302 that application 24 is still running, which is shown as "Yes" at step 302, the storage space allocated in HCS 22 to application 24 can be used only by application 24. If, however, application 24 is not running, for example because it was terminated by the user, which is shown as "No" at step 302, it is checked at step 304 ("Keep Allocation?") whether the allocated storage space should or should not be reserved for application 24 for future usage. As stated above, the decision whether to reserve an allocated storage space for a terminated or for an idling application depends on the involved storage allocation usage right(s).

If the allocated storage space should be reserved for application 24, which is shown as "Yes" at step 304, the access rights of application 24 to access the allocated storage space is reserved for application 24, as shown at step 306 ("Enable access, . . . ,"), and the content of the allocated storage area is retained, also shown at step 306 (", . . . , and retain storage content"). If, however, the allocated storage space is not to be reserved anymore for application 24, which is shown as "No" at step 304, the content of the storage space is erased and the storage space is deallocated from application 24. A deallocated storage space may either be managed as part of the general, or public, storage space, or it may be allocated to another application. An allocated storage space may first be deallocated from application 24 and, thereafter, its content may be erased before or concurrently with its allocation to another application. Allocation and deallocation of a storage space, and the circumstances under which the storage space is reserved and its content is retained or erased, are part oft or they are defined in, the storage allocation usage right associated with that application and, optionally, they may also be part of other storage allocation policies, which are associated with other applications.

Figure 4:
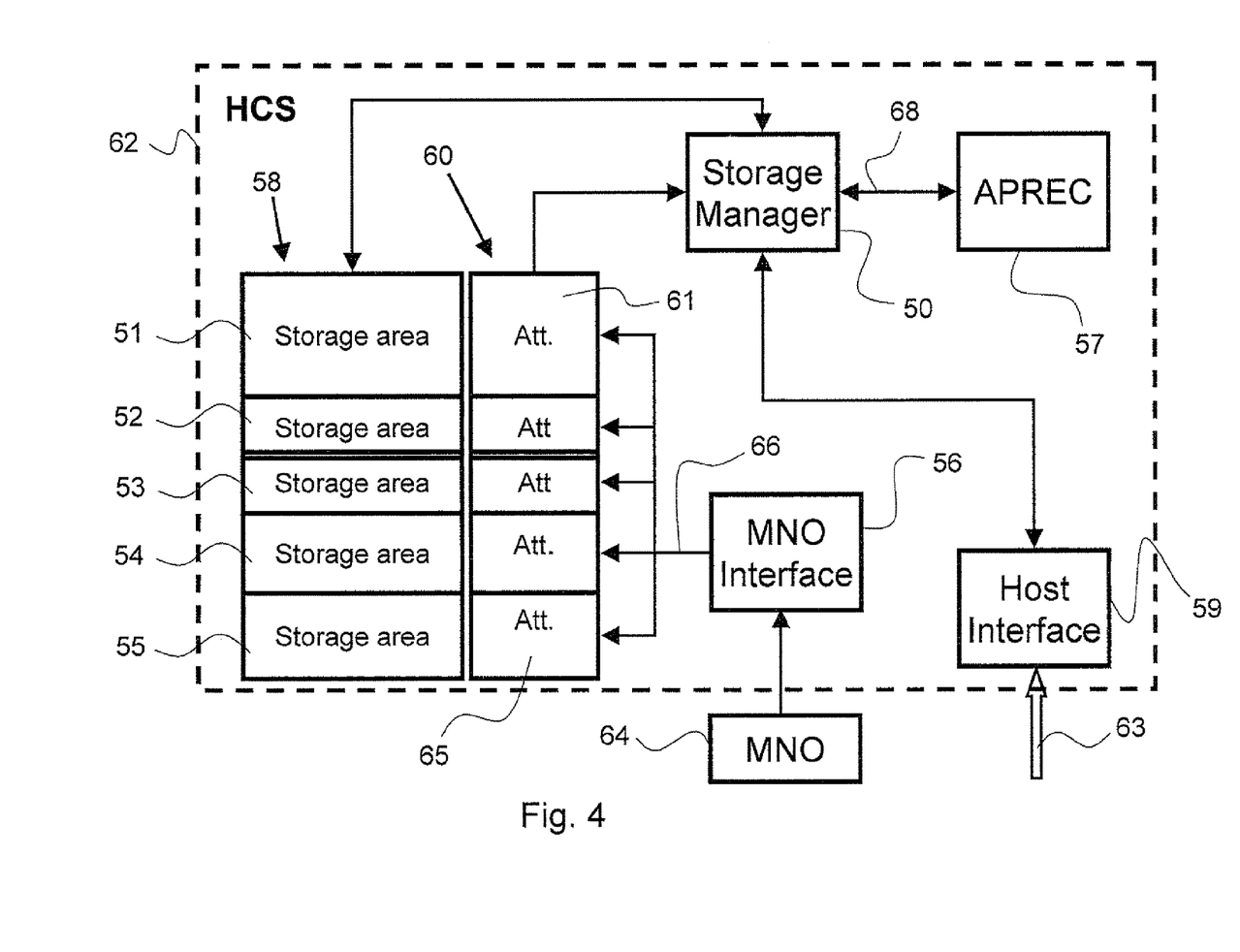
FIG. 4 is a block diagram of a High-Capacity SIM card with partial storage space partitioned in accordance with the present invention.

FIG. 4 depicts an embodiment in which a High-Capacity SIM (HCS) 62 contains a large capacity controllable storage space 58, a storage manager 50, an MNO interface 56, an application recognition (APREC) module 57, and a host interface 59. MNO interface 56, which receives from remote MNO 64 (which may be an exemplary network operator or a service provider) one or more access rules of a storage allocation usage right associated with a licensed application, includes (or there is associated with it) an application register (not shown in FIG. 4) for storing (symbolically shown at 66) the received access rules, and optionally other storage allocation usage right attributes and applications' information. By way of example, storage space 58 is partitioned to five storage spaces, designated as 51, 52, 53, 54 and 55, which are respectively allocated to five applications, and respectively associated with five attribute groups in attributes 60. Each of storage spaces 51 to 55, with its associated attribute group, constitutes a storage allocation usage right. For example, storage space 51 with its associated attribute group 61 constitutes a first storage allocation usage right, and storage space 55 with its associated attribute group 65 constitutes another storage allocation usage right. Remote partitioning of a storage space such as storage space 58 may be implemented by using the storage partitioning method disclosed in '369.

Attributes 60 define which application or applications (depending on the involved storage allocation policies) can access a given storage space within controllable storage space 58, and also the usage or access rules applicable to these applications. Attributes 60 also may define the first address and size of the related storage space within storage space 58. Attributes 60 may also include one or more application identifiers, to which the identifier of a launched or running application is compared, to enable the association of the application to its storage allocation usage right, that is, to the correct storage space within the controllable storage space and to the correct access rules. As storage allocation policies may occasionally be updated, or new storage allocation policies may be added, or currently used policies may be invalidated, the number of allocated storage spaces and their bit-wise size can change over time.

In general, whenever an application needs to write data into, or to read data from, a storage space, it issues a storage access request. According to one embodiment of the present invention, each storage access request originating from an application includes an application's identifier field that holds the application identifier, as provided by the MNO to the publisher of the application, and the APREC 57 obtains the application's identifier (ID) by reading the content of the identifier field of storage access requests. Storage access requests originating from unlicensed applications may also have an ID field but, in this case, the ID field may be empty or it may hold data that marks the application to APREC 57 as an unlicensed application. Storage access requests are known in the field of computers as "storage commands," a storage-related service supported by operating systems of computerized systems.

In reference to FIG. 4, when a licensed application (not shown in FIG. 4) requests an access to the controllable storage space, it issues a storage access request, shown at 63, which storage manager 50 obtains through host interface 59. APREC 57, a service routine of or associated with storage manager 50, reads the content of the ID field in the storage access request to obtain the application's unique identifier; that is, if there is one. If APREC 57 finds a unique identifier in the ID field, then APREC 57 searches in attributes 60 (not shown in FIG. 4), which are associated with the currently stored storage allocation policies, for a matching identifier. If APREC 57 finds a matching identifier in attributes 60, this means that the involved application is licensed, and that one or more access rules of an associated storage allocation usage right have been stored for that application.

Then, APREC 57 utilizes the application's identifier to identify and to communicate to storage manager 50, shown at 68, the identified one or more access rules, to show to storage manager 50 how to control the access of the application to the allocated (the intended) storage space. In other words, APREC 57 communicates to storage manager 50 one or more access rules that, if used by storage manager 50, govern the access of the application to its allocated storage space in storage space 58, which may also be specified in the corresponding attribute group in attributes 60. Storage manager 50, then, controls the access of the application to a storage space allocated for it in controllable storage space 58, for example storage space 51, by applying or enforcing on the application the one or more access rules of the storage allocation usage right identified by APREC 57.

According to another embodiment of the present invention, launched or running applications transfer their identifiers to APREC 57 by using an identifier-transfer (IDT) method, as described in connection with FIGS. 5, 8 and 9, discussed below.

Figure 5:
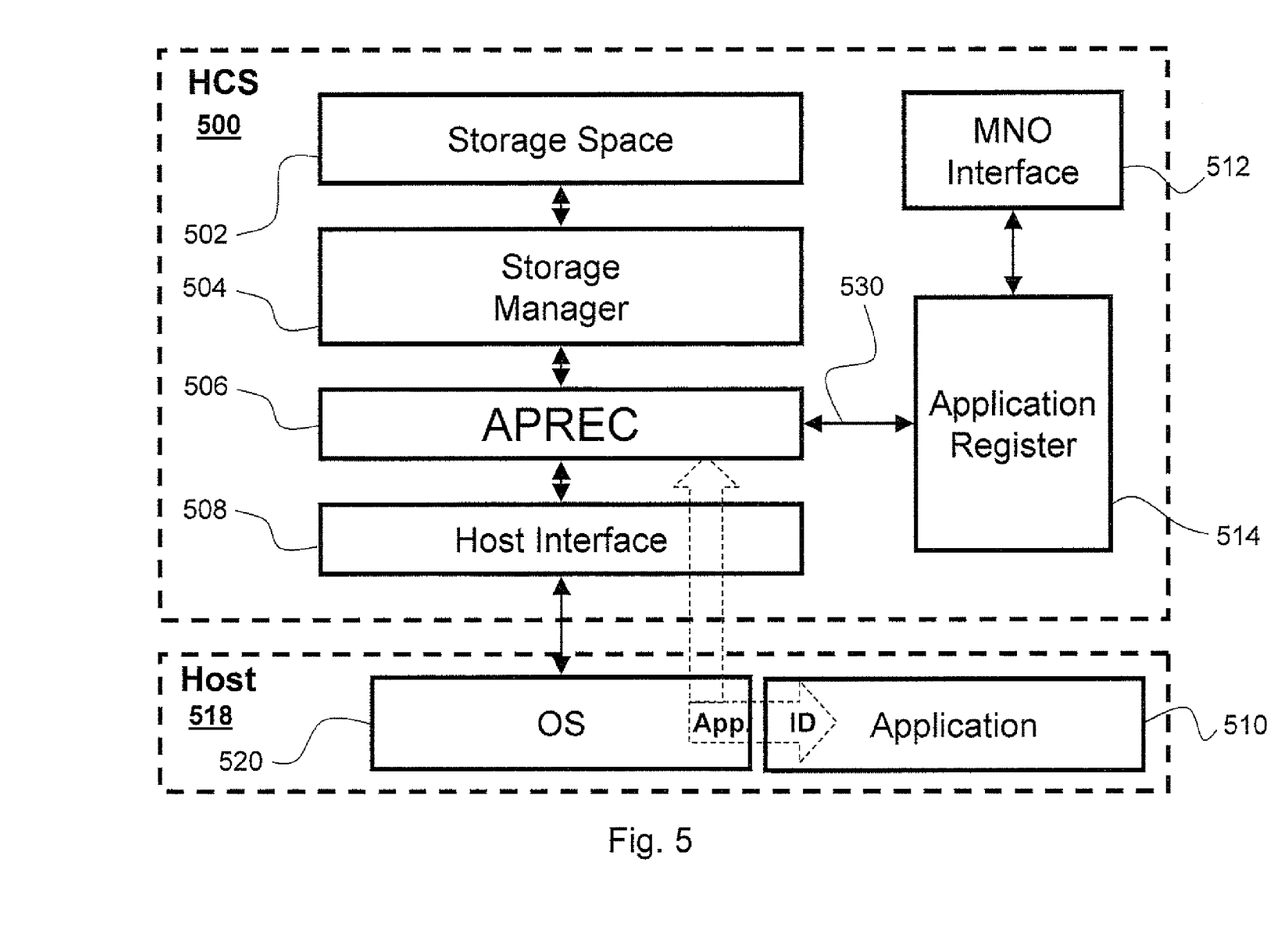
FIG. 5 is a block diagram of a High-Capacity SIM card similar to the High-Capacity SIM card of FIG. 4.

FIG. 5 depicts an embodiment in which storage manager 504 and APREC 506 reside within one device—HCS 500. HCS 500 includes a relatively large (hundreds of mega bytes (MBs)) controllable storage space 502, a storage manager 504, an APREC 506, a host interface 508, an MNO interface 512, and an application register 514. Host 518 has an operating system (OS) 520 for executing applications such as licensed application 510. Controllable storage space 502, or a portion thereof, may be partitioned to include one or more allocated storage spaces similar to storage spaces 51 to 55 of FIG. 4. Attributes, which may be similar to attributes 60 of FIG. 4, may be associated with these one or more allocated storage spaces. MNO interface 512 is configured to receive from one or more remote network operators (not shown in FIG. 5) one or more storage allocation policies, which MNO interface 512 may store in HCS 500 by using application register 514.

In general, two phases are involved in the allocation of a storage space to an application within controllable storage space 502 and in the usage of that storage space. Regarding licensed application 510, the first phase generally includes remotely updating HCS 500, via MNO interface 512, of the storage allocation usage right applicable to application 510. The update data, which includes one or more access rules and the identifier of application 510, is forwarded by MNO 30 of FIG. 1, to application register 514 through MNO interface 512, for storage in HCS 500. The second phase generally involves employment of procedures during, and responsive to, the launching and execution of storage licensed application 510. These procedures are based, at least partially, on the associated storage allocation usage right's particulars stored in HCS 500. When application 510 is launched, and during its execution, it utilizes the storage Application Programming Interface (API) tool of operating system (OS) 520 to communicate a storage access request to storage manager 504 via host interface 508. The term "API" references an inter application communication mechanism used by a computer system's operating system (OS), such as OS 520, and more specifically the term "API" references commands that the OS of a computer system exchange with a computer program, such as application 510. A request for accessing a storage space in storage space 502 is an exemplary command.

In a similar way as described in connection with FIG. 4, APREC 506 obtains the identifier of application 510 and searches, symbolically shown at 530, in the currently stored applications' identifiers for a matching application identifier, and returns to storage manager 504, symbolically shown at 530, one or more access rules of a storage allocation usage right that is associated with the involved application.

Based on the returned one or more access rules, storage manager 504 controls the access of application 510 to, and in general the usage of, the storage space allocated to application 510 in storage space 502. For simplicity, APREC 506 and storage manager 504 are distinctly shown in FIG. 5. However, like APREC 57 and storage manager 50 of FIG. 4, APREC 506 may be an integral part of storage manager 504.

It is noted that each time an application issues a storage access request, the application inserts its unique identifier into the storage access request's ID field, to thereby transfer its ID to the APREC. However, conventional storage access requests do not have such a field. Therefore, utilizing storage access requests to transfer applications' identifiers to a storage manager requires modifications in the host's operating system. To eschew that limitation, other methods, which do not require such modifications, may be used to transfer identifiers from licensed applications to a storage manager. A method that utilizes an identifier-transferring (IDT) file to transfer identifiers from licensed applications to a storage manager is such a method.

Using an IDT File

According to an embodiment of the present invention, an identifier-transferring (IDT) file is manipulated by a licensed application, such as application 510, to transfer the application's identifier to the APREC. "Manipulation" of an IDT file includes using standard "open", "read" and "write" file commands. Using an IDT file enables using conventional operating systems "as is"; that is, without modifying or upgrading them. A host, such as host 518, may have an identifier-transferring (IDT) file installed thereon as one of the system' files, or the involved network operator (not shown in FIG. 5) may download the identifier-transferring file into the host prior to or along with the first storage allocation usage right it sends to HCS 500.

In this embodiment, application 510 utilizes the file-related API service to manipulate the identifier-transferring file to forward the identifier of application 510 to APREC 506, via host interface 508. In order to distinguish the identifier-transferring file from other files, the identifier-transferring file may be assigned a special name, or its name may include a special string of characters, or a special prefix, for example "abc" or "ID_transfer", etc.

Regarding the method illustrated in FIG. 2, if an IDT file is used to obtain application identifiers, rig. 2, and the description thereof, should be modified as follows. Step 74 ("MMNO provides an application identifier (ID) for the application") should be modified to so as to include the provision of the IDT file's name to the application's publisher along with the application's identifier. Also, step 78 of FIG. 2 ("Publisher creates a storage licensed application") may be modified to include usage of a procedure in the application for manipulating the IDT file in the host. Preparing the application for running on a host, includes appending, such as by embedding, incorporating or affiliating, the application's unique ID to the application along with the identifier-transferring file's name and, optionally, with a corresponding procedure to handle the IDT file at run time.

The procedure may include instructions for the application to open the IDT file and to write the application's ID into a known or dedicated memory area (not shown in FIG. 5) in controllable storage space 502 and APREC 506 may read the application's identifier from that memory area. Storage manager 504 may allocate or dedicate an area in storage space 502 for temporarily holding identifiers . . . An IDT file may remain open so long as the application, which opened the IDT file, runs, or as specified in the storage allocation usage right applicable to the application. It is noted that an IDT file can be used by, or it may be associated with, or it may serve, one publisher. An IDT file, however, may serve multiple applications and multiple application publishers, provided that the IDT file is not manipulated by more than one application at a time to prevent interference between two or more applications running on the host. After obtaining the application's identifier, APREC 506 links, symbolically shown at 530, the application's identifier with the applicable allocation usage right (i.e., access rule or access rules), and notifies storage manager 504 of the access rule(s) of the storage allocation usage right applicable to the application.

The identifier-transferring file mechanism can be protected from malicious attacks by using known security mechanisms, such as secure channel or electronic signatures. "Secure channel", a commonly used method in computer systems, supports security, registration and authentication services. In other words, secure channel is a technique by which data can be transferred from one place or user to another with reduced risk of interception or tampering. The basic idea of the secure channel mechanism is that, after executing a certain protocol, both parties have the same key, which is presumed to be unknown to anyone else, which is later used for encrypting/decrypting the data sent/received over that channel.

Protecting the identifier-transferring file mechanism with a security mechanism has several benefits. For example, a storage licensed application, such as licensed application 510, and an APREC, such as APREC 506, can authenticate each other with a high level of trust. Also, confidentiality of the data exchanged between storage licensed application 510 and storage manager 504 is maintained, which means that the exchanged data is not accessible to other applications. Confidentiality of data exchanged between a storage licensed application and a storage manager is also maintained because storage licensed applications are registered with the associated application(s) publisher's identification details, and spyware, sniffing, data-tapping applications and the like, which are not intended by nature to be noticed by hosts and by users, will not be able to use false license. As stated above, unlicensed applications, regardless of whether they are malicious or unmalicious, cannot access data contained in an allocated storage area so long as the storage area is reserved for one or more licensed applications. As stated herein, if two or more licensed applications are permitted to share a common storage area, the content of that storage area may be erased before the storage area is rendered to another licensed application.

Figure 6:
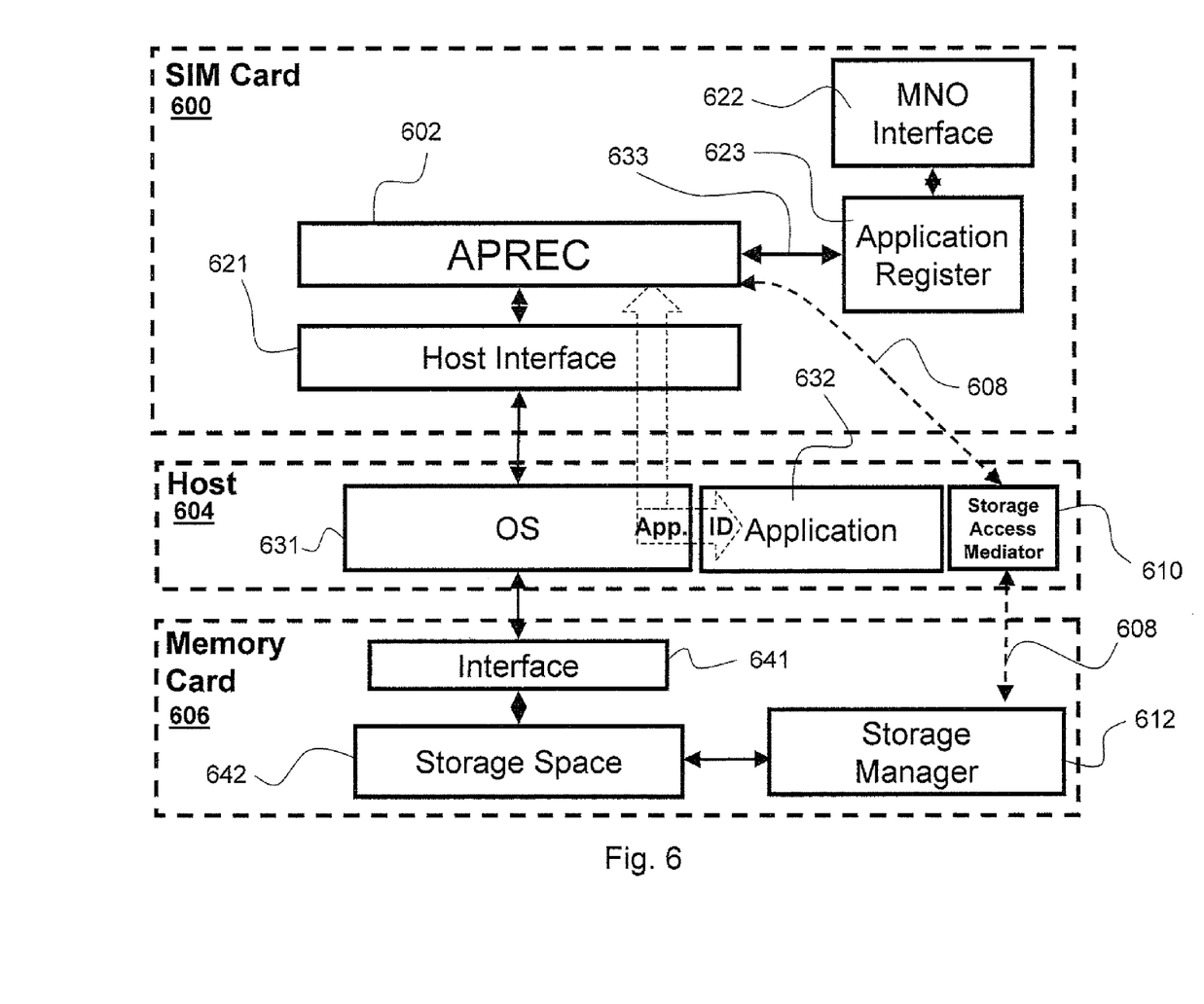
FIG. 6 is a block diagram of a subscriber identifier card configuration according to one embodiment of the present invention.

FIG. 6 depicts an embodiment in which a host 604 interfaces a subscriber identifier card 600, which in this example is a SIM card, and a controllable memory device 606, which in this example is a memory card. In this embodiment, SIM card 600 includes an APREC 602, a host interface 621, an MNO interface 622, and an application register 623. Host 604 includes an operating system (OS) 631 capable of executing licensed application 632, and a storage access mediator 610. Memory card 606 includes a storage manager 612, a memory interface 641, and a controllable storage space 642. Storage space 642 may include allocated storage spaces similar to storage spaces 51 to 55 of FIG. 4, and attributes, which are similar to attributes 60 of FIG. 4, may be associated with these storage spaces. The embodiment shown in FIG. 6 may be used in cases where HCS is not available. In such cases the high capacity storage is provided by a memory card such as memory card 606.

Whenever application 632 requests an access to storage space 642, it forwards its application's identifier (ID) to APREC 602, through host interface 621. Application 632 may transfer its identifier (ID) to APREC 602 by using storage access requests or by manipulating an identifier-transferring (IDT) file, as discussed above, or by using a different mechanism. Based on the application's unique ID forwarded to it by application 632, APREC 602 searches in identifiers stored by application register 623 for a matching identifier, and, upon finding a matching identifier, forwards to storage manager 612 one or more access rules of a storage allocation usage right that is associated with the application. That is, APREC 602 notifies storage manager 612 of access rule(s) according to which storage manager 612 should control the access of application 632 to its allocated storage space within storage space 642.

In the embodiment shown in FIGS. 4 and 5, the storage manager has direct access to the APREC and, as proclaimed before in connection with that embodiment, the APREC can be an integral part of the storage manager. However, in the embodiment shown in FIG. 6, storage manager 612 cannot not directly access APREC 602. In part, this is due to the fact that APREC 602 and storage manager 612 reside in disparate platforms. More specifically, this is because, practically, it is preferred that storage manager 612 resides in the same device as the storage space 642 to facilitate the control of storage manager 612 over access of applications to storage space 642. Accordingly, storage manager 612 resides in one platform; that is, in memory card 606, in direct connection with storage space 642. Likewise, SIM card 600 is directly controlled by a network operator (not shown in FIG. 6), for which reason the network operator can communicate storage allocation policies to SIM card 600, where they are stored by application register 623, but not to memory card 606.

Consequently, storage manager 612 and APREC 602 cannot communicate directly, and storage access mediator 610 bridges that gap, with the logical bridge shown at 608. Storage access mediator 610 enables interoperability and messaging between the two disparate platforms. Practically, storage manager 612 and storage access mediator 610 communicate through interface 641, and storage access mediator 610 and APREC 602 communicate through host interface 621. After storage manager 612 obtains, through storage access mediator 610, the usage and access rules relating to application 632, storage manager 612 enables application 632 to access its allocated storage area (not shown in FIG. 6) in storage space 642 in accordance with these rules. In one embodiment, first memory device 600 and second memory device 606 are the same device, or they reside on a common platform, as exemplified in FIG. 5, in which the same device or the common platform is HCS 500.

The storage space, regardless of whether it is a memory card, HCS, or another type card, may be owned by, or belong to, a network operator or to an application publisher. The network operator and publisher may be the same entity.

Figure 7:
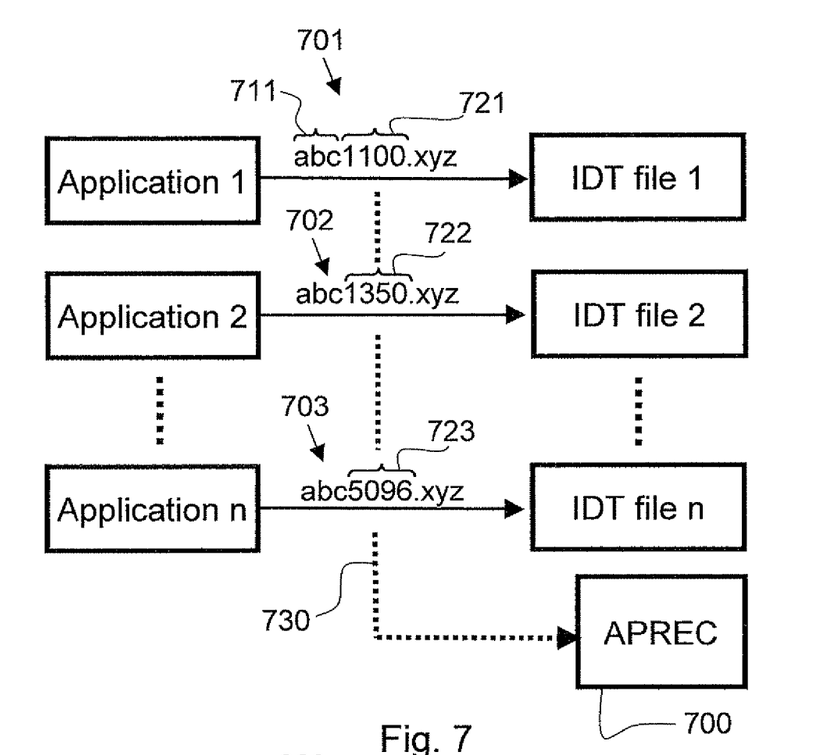
FIG. 7 schematically illustrates a way of using an IDT file to transfer a unique application identifier from an application to an APREC.

FIG. 7 illustrates an embodiment in which each of n applications (n=1, 2, 3, . . . ,), designated as "Application 1," "Application 2", . . . , "Application n," exclusively utilizes a unique IDT file to transfer to storage manager 700 the identifier appended to it by the application publisher. That is, "Application 1" exclusively utilizes "IDT file 1", "Application 2" exclusively utilizes "IDT file 2", and so on. As proclaimed above, the application transfers to application recognition (APREC) module, such as APREC 506 of FIG. 5, its unique identifier, and, based on that identifier, the APREC identifies and returns to the storage manager one or more access rules of a storage allocation usage right associated with the involved application. An IDT file is unique its name contains the application's unique identifier. In the example shown in FIG. 7 the name of "IDT file 1" is "abc1100.xyz", shown at 701, the name of "IDT file 2" is "abc1350.xyz", shown at 702, and the name of "IDT file n" is "abc5096.xyz", shown at 703.

It may be predetermined that a trailing group of characters following a leading group of characters in the IDT file's name is the application's identifier. In the example shown in FIG. 7, the predetermined leading group of characters is "abc", shown, for example, at 711. Regarding "Application 1," the trailing group of characters "1100," shown at 721, is the identifier of "Application 1." Likewise, the trailing group of characters "1350," shown at 722, is the identifier of "Application 2," and the trailing group of characters "5096," shown at 723, is the identifier of "Application 2."

Whenever "Application 1", for example, requests an access to a storage space, it forwards, symbolically shown at 730, its identifier to APREC 700 in the following way. "Application 1" issues an "open" file command to open "IDT file 1" by using the IDT file name "abc1100.xyz", shown at 701, as appended to the application by the application's publisher. As part of its job as a mediator between applications and storage spaces, the storage manager associated with APREC 700 monitors file commands originating from applications. This way, APREC 700 reads, symbolically shown at 730, the name of "IDT file 1" every time "Application 1" opens "IDT file 1," or, if the file is already open, it reads, or extracts, the application's identifier portion from the IDT file's name.

The leading group of characters "abc", shown, for example, at 711, which is commonly used by "Application 1" to "Application n," may indicate to APREC 700 that the trailing group of characters "1100", shown at 721, is the identifier of "Application 1," the trailing group of characters "1350" is the identifier of "Application 2," and so on.

Figure 8:
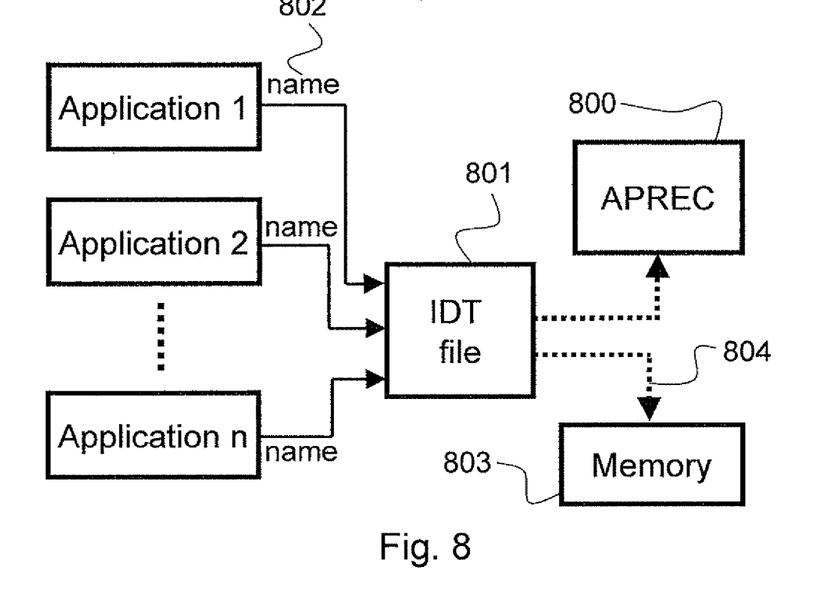
FIG. 8 schematically illustrates another way of using an IDT file to transfer a unique application identifier from an application to an APREC.

FIG. 8 illustrates an embodiment in which n applications (n=1, 2, 3, . . . ,), designated as "Application 1," "Application 2", . . . , "Application n," utilize a common IDT file, shown at 801, to transfer their identifiers to APREC 800. Unlike the embodiment of FIG. 7, the name "name", shown, for example, at 802, of IDT file 801 cannot be used to transfer application identifiers because the same IDT file's name is used by each and every "Application 1" to "Application n". Therefore, IDT file 801 is used by "Application 1" to "Application n" in a different way, as discussed below.

Whenever one of "Application 1" to "Application n" requests an access to a storage space (not shown in FIG. 8), the application opens IDT file 801 by using the IDT file's name "name", shown at 802, and requests the storage manager associated with APREC 800 to write its identifier into storage 803. According to one aspect of this embodiment, storage 803 is fictive and whenever the storage manager associated with APREC 800 is asked to write data into storage 803, APREC 800 interprets that data as an application identifier. According to another aspect of this embodiment, storage 803 actually exists and every time the storage manager associated with APREC 800 is asked to write data into storage 803 APREC 800 interprets that data as an application identifier.

If an IDT file is to be exclusively used by an application, as illustrated in FIG. 7, the IDT file's name may be solely transmitted from the network operator to the application's publisher and to the involved mobile device(s), or in addition to an explicit application identifier. If, however, an IDT file is commonly used by several applications, both the IDT file's name and the application's identifier are communicated to the application publisher and to the involved mobile device.

The present invention may, of course, be carried out in different ways than those herein set forth without departing from the spirit and characteristics of the invention. The embodiments shown and described herein are, therefore, to be considered in all respects as illustrative and not restrictive, and all changes coming within the meaning and equivalency range of the appended claims are intended to be embraced therein.

What we claim:

1. A storage system for controlling access by an application running on a host, the storage system comprising:
    a storage area;
    an interface configured to removably connect to the host and to receive an access request from the host, the access request indicative of a request for access to at least a portion of the storage area from the application running on the host; and
    a controller operatively coupled to the interface and to the storage area, the controller configured to:
        analyze at least a part of the access request to determine an application identifier in the access request, the application identifier indicative of the application;
        compare the application identifier with a storage area control indicator, the storage area control indicator indicative of at least one condition for access to the at least a portion of the storage area and associated with the at least a portion of the storage area prior to receipt of the access request; and
        in response to comparing the application identifier with the storage area control indicator, determine whether to perform the access request in order to allow access of the application to the at least a portion of said storage area.

2. The storage system according to claim 1, wherein the host is a mobile device.

3. The storage system according to claim 2, wherein said mobile device is a mobile phone.

4. The storage system according to claim 1, wherein the storage system is a High-Capacity SIM card.

5. The storage system according to claim 1, wherein the storage system is a memory card.

6. The storage system according to claim 1, wherein the storage area control indicator includes at least one access rule, the at least one access rule indicative of application exclusive access; and
    wherein the controller is configured to determine whether to perform the access request by determining whether the access request originated from the application running on the host so that the application has exclusive access to the at least a portion of the storage area.

7. The storage system according to claim 6, wherein the controller is further configured to receive the at least one access rule via a usage right interface.

8. The storage system according to claim 7, wherein the controller is further configured to:
    receive at least one allocation attribute, the allocation attribute being set remotely for the application running on the host, and
    allocate the portion of the storage area using the at least one allocation attribute; and
    wherein the controller is configured to determine whether to perform the access request to the allocated portion according to the at least one access rule.

9. The storage system according to claim 8, wherein the at least one allocation attribute comprises a size of storage space to be allocated; and
    wherein the controller is configured to allocate the size of the storage space for use by the application.

10. The storage system according to claim 1, wherein the storage area control indicator includes a storage identifier identifying the application running on the host associated with the at least a portion of the storage area
    wherein the controller is configured to determine whether to perform the access request by comparing the storage identifier with the application identifier in order to determine that the access request was requested by the application running on the host.

11. The storage system according to claim 1, wherein the access request includes an application identifier field; and
    wherein the controller is configured to analyze the application identifier field to determine that the access request relates to the application.

12. The storage system according to claim 1, wherein the access request includes a file name; and
    wherein the controller is configured to analyze the file name to determine that the access request relates to the application.

13. The storage system according to claim 1, further comprising:
    a usage right interface configured to receive the at least one access rule; and
    a host interface configured to receive the access request, wherein the usage right interface is separate from the host interface.

14. The storage system according to claim 13, wherein the usage right interface comprises a network interface.

15. The storage system according to claim 14, wherein the network interface comprises a mobile network operator interface.

16. The storage system according to claim 1, wherein the at least a portion of the storage area comprises a controllable storage space;
   wherein the access request includes an indication of at least a part of the controllable storage space;
   wherein the storage area control indicator is associated with the controllable storage space; and
   wherein in response to determining that the storage area control indicator is the same as the application identifier in the access request, the controller is configured to perform the access request in order to allow the application access to the controllable storage space.

17. The storage system according to claim 16, wherein the access request includes a read access request; and
   wherein the controller is configured to execute the read access request by sending stored data in the controllable storage space to the host in response to determining that the storage area control indicator is the same as the application identifier in the access request.

18. The storage system according to claim 16, wherein the storage area control indicator further includes at least one access rule; and
   wherein in response to determining that the storage area control indicator is the same as the application identifier in the access request, the controller is configured to execute the at least one access rule in order to determine whether to allow the application access to the controllable storage space.

19. A method for controlling access to a storage area by an application running on a host, the method comprising:
   associating a storage area control indicator with at least a portion of the storage area, the storage area control indicator indicative of at least one condition for access to the at least a portion of the storage area;
   after associating the application identifier with at least a portion of the storage area, receiving an access request from the host, the access request indicative of a request for access to the at least a portion of the storage area from the application running on the host;
   analyzing at least a part of the access request to determine an application identifier in the access request, the application identifier indicative of the application;
   comparing the application identifier with the storage area control indicator; and
   in response to comparing the application identifier with the storage area control indicator, determining whether to perform the access request in order to allow access of the application to the at least a portion of said storage area.

20. The method according to claim 19, wherein the storage area control indicator includes at least one access rule; and
   further comprising receiving the at least one access rule, the least one access rule being set remotely for the application running on the host.

21. The method according to claim 20, wherein the at least one access rule comprises application exclusive access; and
   wherein allowing access of the application comprises providing the application exclusive access to the at least a portion of the storage area.

22. The method according to claim 20, further comprising:
   receiving at least one allocation attribute, the allocation attribute being set remotely for the application running on the host, and
   allocating the portion of the storage area using the at least one allocation attribute; and
   wherein determining whether to perform the access request is according to the at least one access rule.

23. The method according to claim 22, wherein the at least one allocation attribute comprises a size of storage space to be allocated; and
   wherein allocating the portion of a storage area using the at least one allocation attribute comprises allocating the size of the storage space for use by the application.

24. The method according to claim 19, wherein the storage area control indicator includes a storage identifier identifying the application associated with the at least a portion of the storage area
   wherein determining whether to perform the access request includes comparing the storage identifier with the application identifier in order to determine whether the access request was requested by the application running on the host.

25. The method according to claim 19, wherein the access request includes an application identifier field; and
   wherein determining whether to perform the access request comprises analyzing the application identifier field to determine that the access request relates to the application.

26. The method according to claim 19, wherein the access request includes a file name; and
   wherein determining whether to perform the access request comprises analyzing the file name to determine that the access request relates to the application.

27. The method according to claim 19, wherein the at least a portion of the storage area comprises a controllable storage space;
   wherein the access request includes an indication of at least a part of the controllable storage space;
   wherein the storage area control indicator is associated with the controllable storage space;
   wherein in response to determining that the storage area control indicator is the same as the application identifier in the access request, performing the access request in order to allow the application access to the controllable storage space.

28. The method according to claim 27, wherein the access request includes a read access request; and
   executing the read access request in order to allow read access to the controllable storage space in response to determining that the storage area control indicator is the same as the application identifier in the access request.

29. The method according to claim 27, wherein the storage area control indicator further includes at least one access rule;
   wherein in response to determining that the storage area control indicator is the same as the application identifier in the access request, executing the at least one access rule in order to determine whether to allow the application access to the controllable storage space.

* * * * *